(12) United States Patent
Yoshida

(10) Patent No.: US 7,173,761 B2
(45) Date of Patent: Feb. 6, 2007

(54) FRESNEL LENS SHEET

(75) Inventor: Yoshiki Yoshida, Shinjuku-ku (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 214 days.

(21) Appl. No.: 10/508,422

(22) PCT Filed: Mar. 26, 2003

(86) PCT No.: PCT/JP03/03746

§ 371 (c)(1),
(2), (4) Date: Sep. 21, 2004

(87) PCT Pub. No.: WO03/083575

PCT Pub. Date: Oct. 9, 2003

(65) Prior Publication Data

US 2005/0141087 A1    Jun. 30, 2005

(30) Foreign Application Priority Data

Mar. 28, 2002    (JP)    ............... 2002-091752

(51) Int. Cl.
*G03B 21/56* (2006.01)
*G03B 21/60* (2006.01)

(52) U.S. Cl. .............. 359/457; 359/443; 359/454; 359/456

(58) Field of Classification Search ............... 359/443, 359/460, 454–457

See application file for complete search history.

(56) References Cited

U.S. PATENT DOCUMENTS

| | | | | |
|---|---|---|---|---|
| 4,756,603 A | * | 7/1988 | Ohtani | .................. 359/601 |
| 5,751,387 A | * | 5/1998 | Iigahama et al. | ............. 349/95 |
| 6,151,162 A | * | 11/2000 | Van De Ven | ............... 359/443 |
| 6,211,932 B1 | * | 4/2001 | Iigahama et al. | ............. 349/95 |
| 6,380,994 B1 | * | 4/2002 | Iigahama et al. | ............. 349/73 |
| 6,407,859 B1 | * | 6/2002 | Hennen et al. | ............. 359/454 |
| 6,710,941 B2 | * | 3/2004 | Hennen et al. | ............. 359/742 |

FOREIGN PATENT DOCUMENTS

| | | |
|---|---|---|
| JP | 59-095525 | 6/1984 |
| JP | 3002220 | 11/1999 |
| JP | 2001-209130 | 8/2001 |

* cited by examiner

*Primary Examiner*—W. B. Perkey
*Assistant Examiner*—Magda Cruz
(74) *Attorney, Agent, or Firm*—Oliff & Berridge, PLC

(57) ABSTRACT

The present invention provides a Fresnel lens sheet capable of successfully avoiding the "collapse", "abrasion" and "moire" problems. A Fresnel lens sheet constitutes, together with a lenticular lens sheet, a rear projection screen, which is mounted in the frame of a rear projection type display. The Fresnel lens sheet includes, on one surface of its substrate, a Fresnel lens part containing a plurality of lenses concentrically formed on one plane. The apexes of the lenses situated in the area between the center and the outer edge of the Fresnel lens part are flattened to give flat faces, and the widths of the flat faces of the lenses on the outer edge side are made greater than the widths of the flat faces of the lenses on the center side. The widths of the flat faces of the lenses are from 0 to 30 μm.

8 Claims, 9 Drawing Sheets

FRESNEL LENS SHEET

BACKGROUND OF THE INVENTION

1. Field of the Invention

The present invention relates to a Fresnel lens sheet for use in a rear projection screen.

2. Description of Related Art

A rear projection screen is used for a rear projection type display or the like, and comprises: a Fresnel lens sheet that will be positioned on the light source side; and a lenticular lens sheet that will be positioned on the viewer's side. Such a rear projection screen is mounted in the frame of a rear projection type display or the like, with the Fresnel lens sheet and the lenticular lens sheet being in contact with each other.

FIG. 9 is a view showing a conventional Fresnel lens sheet. As shown in FIG. 9, a Fresnel lens sheet 10' has a Fresnel lens part 13 that contains a plurality of lenses 11 formed on one plane. The shape of each lens 11 contained in the Fresnel lens part 13 is determined mainly by the lens angle θ and the non-lens angle α; of these angles, the lens angle θ is determined by the optical properties required for the Fresnel lens part 13. Namely, the lenses 11 continuously increase in lens angle θ as the lens position gets away from the center toward the outer edge of the Fresnel lens part 13, and owing to this increase in lens angle θ, the apexes 11a of the lenses 11 become sharper as the lens position gets away from the center toward the outer edge of the Fresnel lens part 13.

As shown in FIG. 10, such a Fresnel lens sheet 10' constitutes, together with a lenticular lens sheet 20 (and, if necessary, a front panel (not shown in the figure)), a rear projection screen 30, which is mounted in the frame (not shown in the figure) of a rear projection type display or the like. In order to prevent production of fuzzy images that is caused by separation between the Fresnel lens sheet 10' and the lenticular lens sheet 20, the lenticular lens sheet 20 is curved along the Fresnel lens sheet 10'. It is therefore possible to keep the Fresnel lens sheet 10' and the lenticular lens sheet 20 being in close contact with each other.

As mentioned above, in the Fresnel lens sheet 10', the apexes 11a of the lenses 11 in the Fresnel lens part 13 become sharper as the lens position gets away from the center toward the outer edge of the Fresnel lens part 13. Therefore, at points B at which the Fresnel lens sheet 10' and the lenticular lens sheet 20 come in contact with each other, the apexes 11a of the lenses 11 in the Fresnel lens part 13 are pressed by the lenticular lens part 21, as shown in FIG. 10. Consequently, the apexes 11a of the lenses 11 are collapsed and deformed, which tends to lead to the distortion of imaging light. This "collapse" problem often occurs in area C (the hatched area in FIG. 11) which is the marginal part of the rear projection screen 30 along its four sides, the width of this part being not more than 200 mm, and in which the apexes 11a of the lenses 11 in the Fresnel lens part 13 are sharper.

Further, in the Fresnel lens sheet 10", the apexes 11a of the lenses 11 in the Fresnel lens part 13 become sharper as the lens position gets away from the center toward the outer edge of the Fresnel lens part 13, as mentioned above, so that at points D at which the Fresnel lens sheet 10' and the lenticular lens sheet 20 come in contact with each other, the apexes 11a of the lenses 11 in the Fresnel lens part 13 and the lenticular lens part 21 are, as shown in FIG. 12, rubbed with each other because of vibration that is caused during transportation, for example. As a result, the lenticular lens part 21 is partly abraded by the apexes 11a of the lenses 11 in the Fresnel lens part 13 and is thus deformed, which tends to lead to the distortion of imaging light. Although this "abrasion" problem occurs on the entire surface of the rear projection screen 30, it occurs more often in the area C (the hatched area in FIG. 11) which is the marginal part of the rear projection screen 30 along its four sides, the width of this part being not more than 200 mm, and in which the apexes 11a of the lenses 11 in the Fresnel lens part 13 are sharper.

In order to solve the above-described "collapse" and "abrasion" problems, attempts have been made to properly control and design the physical properties of molding resins for the Fresnel lens sheet 10' and for the lenticular lens sheet 20. It is, however, difficult to fully solve the "collapse" and "abrasion" problems by such measures.

On the other hand, such a rear projection screen 30 as is shown in FIGS. 10 to 12 (a rear projection screen 30 comprising a Fresnel lens sheet 10' and a lenticular lens sheet 20) has the shortcoming that bright-and-dark fringes that appear separately on the Fresnel lens sheet 10' and on the lenticular lens sheet 20 produce a moiré pattern. Such a moiré pattern tends to appear in the marginal part of the rear projection screen 30 (see symbol M in FIG. 11).

Namely, black stripes (see reference numeral 22 in FIG. 1A) are usually provided periodically on the lenticular lens sheet 20, and owing to these black stripes 22, vertical bright-and-dark fringes appear periodically on the lenticular lens sheet 20 in the horizontal direction. On the other hand, in the Fresnel lens sheet 10', portion A through which light from a source inherently does not pass exists in each lens 11 in the Fresnel lens part 13, as shown in FIG. 9. Therefore, bright-and-dark fringes appear along the lenses 11 that extend concentrically, for example. Since the radii of the concentric lenses 11 in the Fresnel lens part 13 are greater in the outer edge part of the Fresnel lens sheet 10', the bright-and-dark fringes appear almost vertically in this part of the Fresnel lens sheet 10'. The vertical bright-and-dark fringes that appear periodically on the lenticular lens sheet 20 and the almost vertical bright-and-dark fringes that appear on the Fresnel lens sheet 10' produce moiré fringes that are periodically repeating in the horizontal direction.

To solve the above-described "moiré" problem, there has been proposed a method of reducing the appearance of a moiré pattern, in which the ratio of the lens pitch on a Fresnel lens sheet 10' to that on a lenticular lens sheet 20 is made either "N+0.35 to 0.43" or "1/(N+0.35 to 0.43)" (where N is a natural number of 2 to 12) (see Japanese Laid-Open Patent Publication No. 95525/1984, for example).

Further, in order to control the vertical diffusion of light, a diffusing agent is often incorporated in the substrate of a Fresnel lens sheet 10', or a lens part called V-type lenticular lenses (lenticular lenses for vertically diffusing light) is often provided on the plane of incidence of a Fresnel lens sheet 10'. In either case, incident light F, light from a source, diffuses in the substrate of the Fresnel lens sheet 10' to become diffused light G, as shown in FIG. 9, and diffused light H is to strike even the portion A through which the light from a source inherently does not pass. This portion A is, therefore, prevented from getting dark, and, as a result, the appearance of a moiré pattern is reduced.

It is, however, difficult to fully solve the "moiré" problem by any of the above-described conventional means. In particular, in the case where a diffusing agent is incorporated in a Fresnel lens sheet 10', or where a V-type lenticular lens part is provided on a Fresnel lens sheet 10', imaging light that has passed through a lenticular lens sheet 20 and that will finally produce an image diffuses while passing through the Fresnel lens sheet 10', so that the image produced appears fuzzy.

Those Fresnel lens sheets that are described in Japanese Laid-Open Patent Publication No. 249602/1991 are related to the present invention. The apexes of lenses on these Fresnel lens sheets are in the shapes of circular arcs with curvature radii between 1 μm and 10 μm, in the shapes of polygons with curvature radii between 1 μm and 10 μm, or in the shapes of planes with lengths between 1 μm and 10 μm.

However, the purposes of the technique described in the above Japanese Laid-Open Patent Publication No. 249602/1991 are to eliminate the difficulty in releasing a Fresnel lens sheet from a mold and to prevent the apexes of prism lenses from being damaged, and the aforementioned "collapse", "abrasion" and "moiré" problems cannot fully be solved by this technique. In particular, in the technique described in this Patent Publication, the shape of the apexes of the prism lenses is determined, over the entire Fresnel lens sheet surface, solely by the shape of a tool tip. Therefore, of the light from a source, incident on the Fresnel lens sheet, the light incident on a part of the Fresnel lens sheet (especially on the center portion) tends to become stray light, and this stray light adversely affects the rear projection screen.

SUMMARY OF THE INVENTION

The present invention has been accomplished in view of the above-described problems. An object of the present invention is, therefore, to provide a Fresnel lens sheet capable of successfully avoiding the aforementioned "collapse", "abrasion" and "moiré" problems.

The present invention provides a Fresnel lens sheet for use in a rear projection screen, comprising: a Fresnel lens part containing a plurality of lenses formed on one plane, wherein, among the lenses of the Fresnel lens part, the apexes of those lenses situated in at least a part of the area between the center and outer edge of the Fresnel lens part are flattened to give flat faces, and the widths of the flat faces of the lenses on the side of the outer edge are made greater than the widths of the flat faces of the lenses on the side of the center.

In the present invention, it is preferable that the flat faces of the lenses increase in width either continuously or stepwise as the lens position gets away from the center toward the outer edge of the Fresnel lens part.

Further, in the present invention, it is preferable that the flat faces of the lenses situated in a certain area of the Fresnel lens part have the same width. It is preferable that the area in which the widths of the flat faces of the lenses are the same be situated on the side of the outer edge of the Fresnel lens part.

Furthermore, in the present invention, it is preferable that the apex of each of the lenses be flattened to give a flat face within a portion of the lens that does not affect the light path of light from a source. The widths of the flat faces of the lenses are preferably from 0 to 30 μm. It is also preferable that the lenses be formed concentrically.

Furthermore, in the present invention, it is preferable that the apexes of only those lenses situated in the area between the midpoint at a specified distance away from the center of the Fresnel lens part and the outer edge of the Fresnel lens part be flattened to give flat faces.

According to the present invention, the apexes of lenses situated in the area between the center and the outer edge of the Fresnel lens part are flattened to give flat faces, and the widths of the flat faces of the lenses on the side of the outer edge are made greater than the widths of the flat faces of the lenses on the side of the center. Therefore, in the area on the side of the outer edge of the Fresnel lens part, in which the apexes of the lenses are sharper, the contact load between the Fresnel lens part of the Fresnel lens sheet and the lenticular lens part of the lenticular lens sheet, that is, the pressure to be exerted on the apexes of the lenses in the Fresnel lens part is effectively decreased. It is thus possible to successfully avoid the aforementioned "collapse" problem. Further, since the apexes of the lenses situated in the area on the side of the outer edge of the Fresnel lens part, in which the apexes of the lenses are sharper, are made obtuse, it is possible to successfully avoid the "abrasion" problem that the lenticular lens part of the lenticular lens sheet is abraded. Moreover, it is possible to allow light that has diffused in the Fresnel lens sheet to effectively emerge from the area on the side of the outer edge of the Fresnel lens part, in which a moiré pattern often appears, so that the portion of each of the lenses through which light from a source inherently does not pass is prevented from getting dark. The appearance of a moiré pattern is thus effectively reduced. The expression "the portion through which light from a source inherently does not pass" herein refers to a portion of each of the lenses through which light from a source does not pass because of the design of the Fresnel lens sheet when the Fresnel lens sheet does not contain a diffusing element such as a diffusing agent or V-type lenticular lenses.

According to the present invention, if the apexes of only those lenses situated in the area between the midpoint at a specified distance away from the center of the Fresnel lens part and the outer edge of the Fresnel lens part are flattened to give flat faces, it becomes possible to successfully avoid the "collapse", "abrasion" and "moiré" problems that often occur in the area on the side of the outer edge of a conventional Fresnel lens part, in which the apexes of lenses are sharper, without impairing the optical properties of the central area of the Fresnel lens part that tends to affect the light path of light from a source.

DETAILED DESCRIPTION OF PREFERRED EMBODIMENTS

By referring to the accompanying drawings, embodiments of the present invention will be described in detail hereinafter.

Figure 1A:
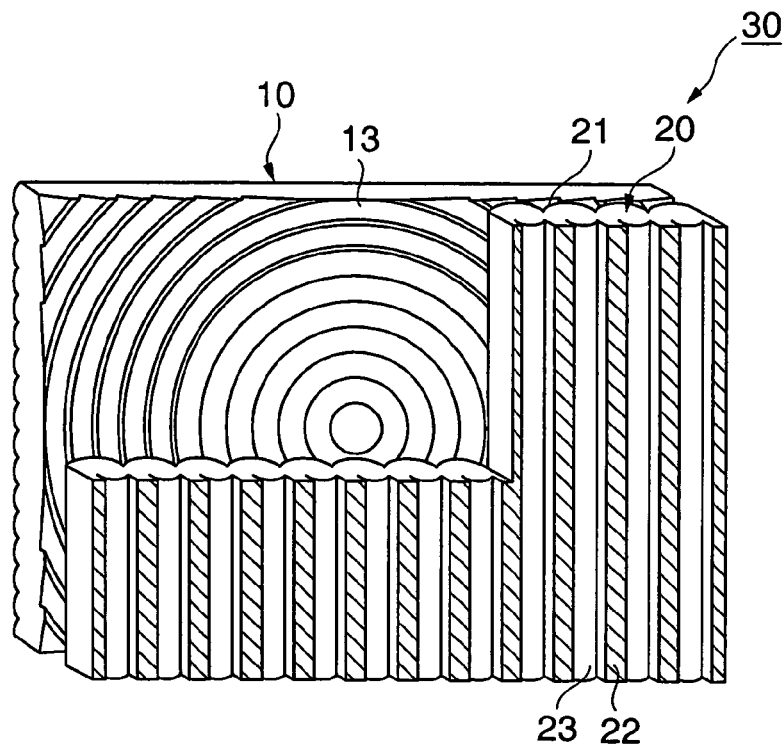
FIG. 1A is a view showing a rear projection screen comprising a Fresnel lens sheet according to an embodiment of the present invention.
Figure 1B:
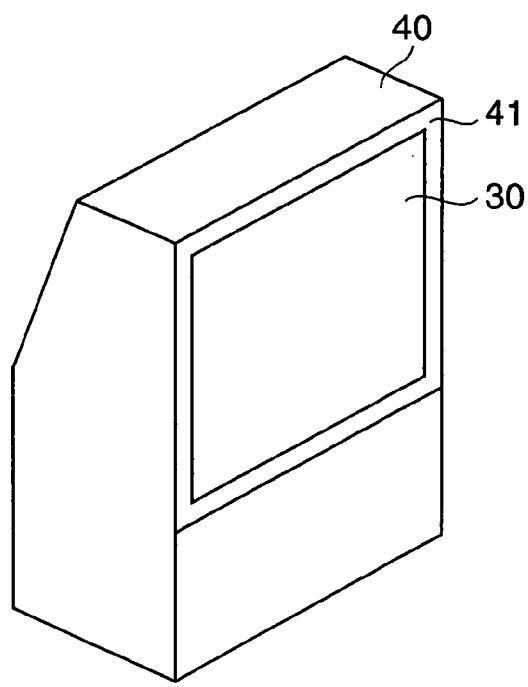
FIG. 1B is a view showing a rear projection type display comprising the rear projection screen shown in FIG. 1A.

As shown in FIG. 1A, a Fresnel lens sheet 10 according to an embodiment of the present invention constitutes, together with a lenticular lens sheet 20, a rear projection screen 30, which is mounted in the frame 41 of a rear projection type display 40 in such a manner as is shown in FIG. 1B. In order to prevent production of fuzzy images that is caused by separation between the Fresnel lens sheet 10 and the lenticular lens sheet 20, the lenticular lens sheet 20 is curved along the Fresnel lens sheet 10. It is, therefore, possible to keep the Fresnel lens sheet 10 and the lenticular lens sheet 20 in close contact with each other. As shown in FIG. 1A, the lenticular lens sheet 20 has, on one surface of its substrate, a lenticular lens part 21, and, on the other surface of the substrate, black stripes 22 and lenses 23 from which light emerges.

Figure 2A:
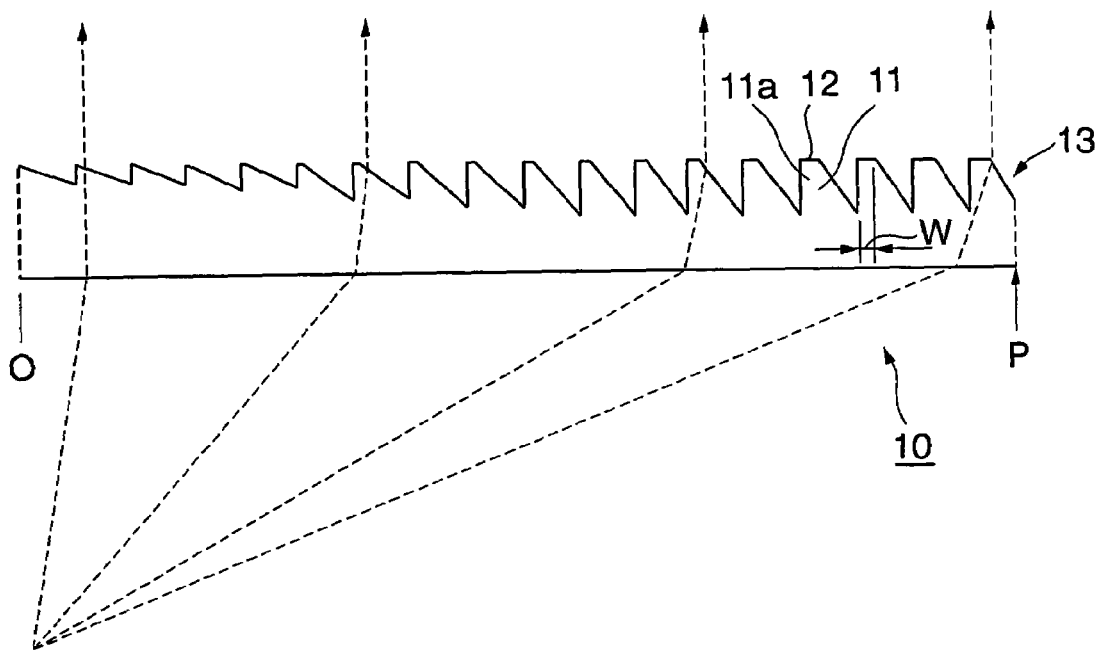
FIG. 2A is a view diagrammatically showing a Fresnel lens sheet according to an embodiment of the present invention.

The Fresnel lens sheet 10 has, on one surface of its substrate, a Fresnel lens part 13. The Fresnel lens part 13 contains a plurality of lenses 11 concentrically formed on one plane, as shown in FIG. 2A, and the apexes 11a of the lenses 11 are flattened to give flat faces 12. When the Fresnel lens sheet 10 is mounted, together with the lenticular lens sheet 20, in the frame 41 of a rear projection type display 40, these two lens sheets are arranged so that the apexes 11a (flat faces 12) of the lenses 11 in the Fresnel lens part 13 come in contact with the lenticular lens part 21 of the lenticular lens sheet 20, as shown in FIG. 1A.

As shown in FIG. 2A, the lenses 11 situated in the area between the center O and the outer edge P of the Fresnel lens part 13 have flat faces 12, and the widths W of the flat faces 12 of the lenses 11 on the outer edge P side of the Fresnel lens sheet 10 are greater than the widths W of the flat faces 12 of the lenses 11 on the center O side of the Fresnel lens sheet 10. Specifically, for example, it is preferable that the flat faces 12 of the lenses 11 linearly (continuously) increase in width W as the lens position gets away from the center O toward the outer edge P of the Fresnel lens part 13 (see FIG. 7A). Preferably, the widths W of the flat faces 12 of the lenses 11 are from 0 to 30 μm.

The actions of the flat faces 12 of the lenses 11 in the Fresnel lens part 13 of the Fresnel lens sheet 10 will be explained with reference to FIGS. 3A and 3B.

Figure 3A:
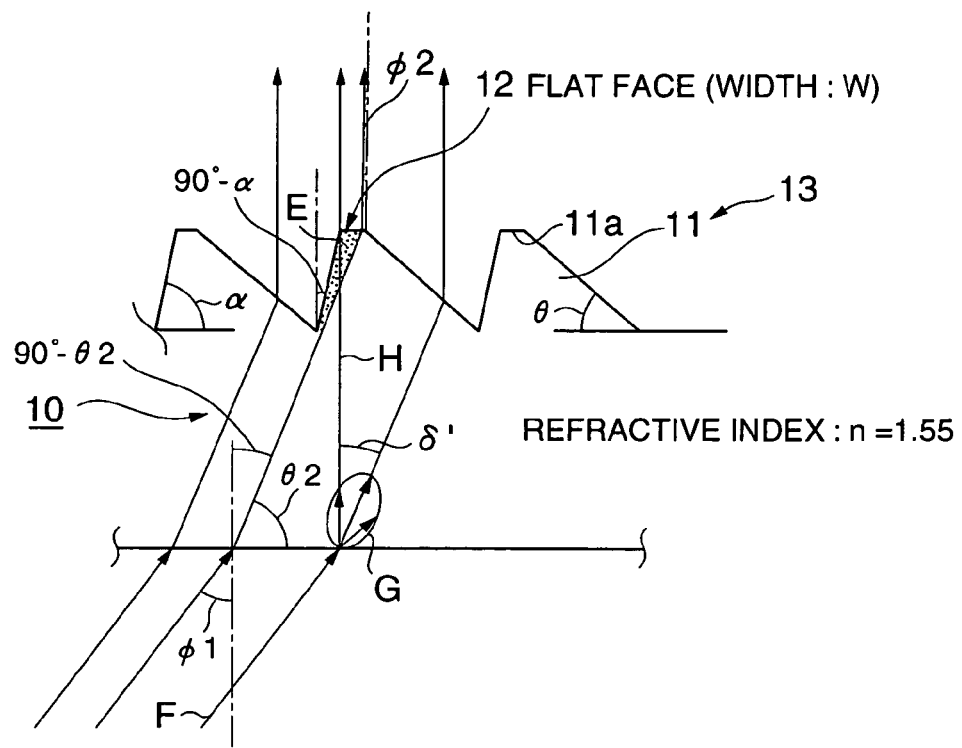
FIGS. 3A and 3B are views for explaining the details of the Fresnel lens sheets according to the above embodiment and another embodiment of the present invention.
Figure 3B:
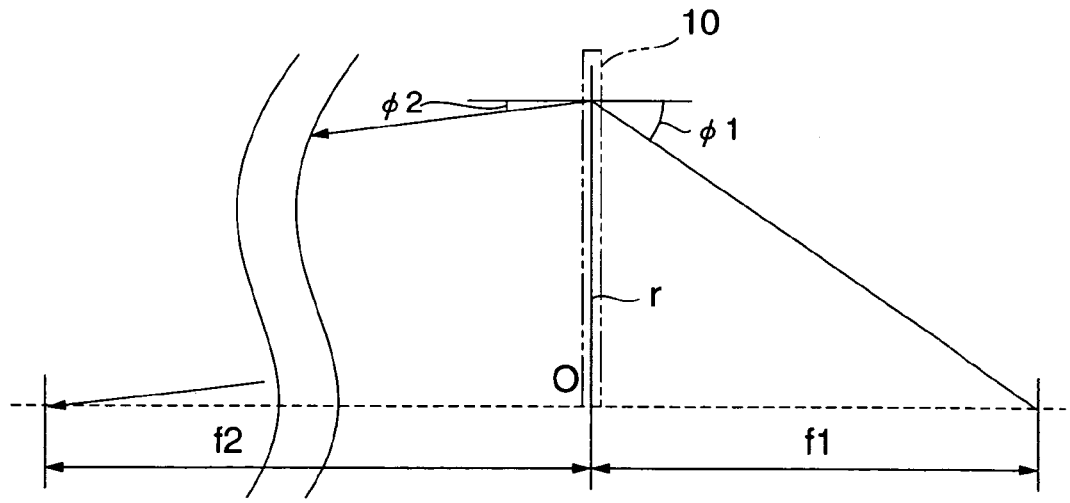

Taken now as an example is the case where, at a predetermined point on the radius of the Fresnel lens sheet 10 (maximum radius=600 mm), the distance between this point and the center O being r, light enters the plane of incidence at the angle of incidence $\phi1$ and emerges from the plane of emergence at the angle of emergence $\phi2$, as shown in FIG. 3B. In this case, the angle $\phi1$ at which light is incident on the Fresnel lens sheet 10 can be calculated by using the equation $\phi1=\tan^{-1}(r/f1)$, where r is the distance from the center O (radius), and f1 is the focal length on the plane of incidence, determined by the optical design.

The light incident on the Fresnel lens sheet 10 at the angle $\phi1$ traces the light path shown in FIG. 3A; that is, the light is refracted at a molding resin having the refractive index n (=1.55), and the refracted light enters, at the light-source refraction angle $\phi2$, the lens 11 with the lens angle θ. The light entering the lens 11 in this manner is refracted at the lens surface of the lens 11 and finally emerges from the Fresnel lens sheet 10 at the angle of emergence $\phi2$. The angle of emergence $\phi2$ can be obtained from the equation $\phi2=\tan^{-1}(r/f2)$, where f2 is the focal length on the plane of emergence, determined by the optical design. The lens angle θ of the lens 11 is determined by the angle of emergence $\phi2$ obtainable by using the focal length f2 on the plane of emergence.

The light-source refraction angle θ2 of light that travels in the substrate of the Fresnel lens sheet 10 is given by the following equation:

$$\theta2=90°-\sin^{-1}(\sin\phi1/n).$$

On the other hand, the non-lens angle α of each lens 11 on the Fresnel lens sheet 10 is so set that the lens 11 does not impede the traveling of light that is incident on the lens 11 at the light-source refraction angle θ2, and is made greater than the angle θ2 in order to utilize diffused light G produced when incident light F, light from a source, is diffused in the substrate of the Fresnel lens sheet 10. Namely, if compared relative to the direction of the normal to the Fresnel lens sheet 10, the angles α and θ2 are in the relationship that the angle (90°−α) is smaller than the angle (90°−θ2).

Figure 4:
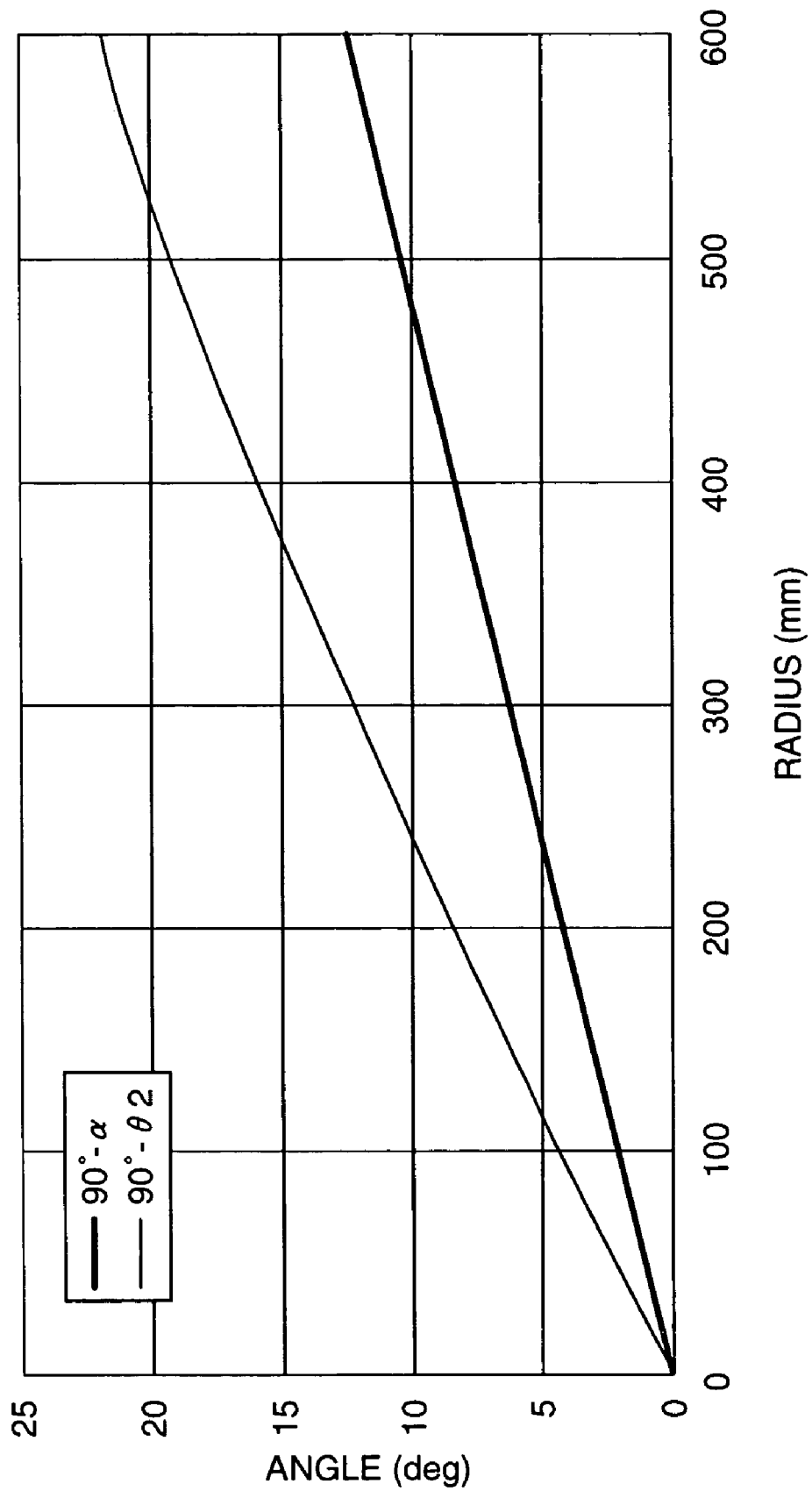
FIG. 4 is a diagram showing the relationship between $(90°-\alpha)$ and $(90°-\theta2)$ in the Fresnel lens sheet shown in FIG. 3A.

Specifically, if the angle ω of the tip of a tool that is used for processing a mold for molding the Fresnel lens part 13 is 45°, the angles (90°−α) and (90°−θ2) are so set that these angles are in such a relationship as is shown in FIG. 4.

In the case shown in FIG. 4, since a difference is produced between the angle (90°−θ2) concerning the light-source refraction angle θ2 and the angle (90°−α) concerning the non-lens angle α, portion E that does not affect the light path of light from a source is to exist in each lens 11, as shown in FIG. 3A, and it becomes possible to provide the flat face 12 within this portion E.

The angle of incidence $\phi1$ increases continuously as the point of incidence gets away from the center O toward the outer edge P of the Fresnel lens part 13. Further, as is clear from the fact that the angle of incidence $\phi1$ is given by the equation $\phi1=\sin^{-1}\{n\times\sin(90°-\theta2)\}$, the angle of refraction (90°−θ2) increases as the angle of incidence $\phi1$ increases. Therefore, the angle of refraction (90°−θ2) also increases, like the angle of incidence $\phi1$, as the point of incidence gets away from the center O toward the outer edge P of the Fresnel lens part 13. With this increase, the difference between (90°−θ2) and (90°−α) continuously increases as shown in FIG. 4, so that the above-described portion E also becomes greater as the lens position gets away from the center O toward the outer edge P of the Fresnel lens part 13. For this reason, if the apex 11a of each lens 11 in the Fresnel lens part 13 is flattened to give a flat face 12 within the portion E, it is possible to make the widths W of the flat faces 12 of the lenses 11 on the outer edge P side greater than the widths W of the flat faces 12 of the lenses 11 on the center O side without affecting the light path of light from a source.

The Fresnel lens sheet 10 is usually produced by a method in which a molding resin such as an ionizing-radiation-curing resin or a thermoplastic, curable resin is molded by the use of a mold (the shape of a mold face is duplicated).

Examples of processes of producing molds that can be used in the above production method include the following two.

(Process 1)

Figure 5A:
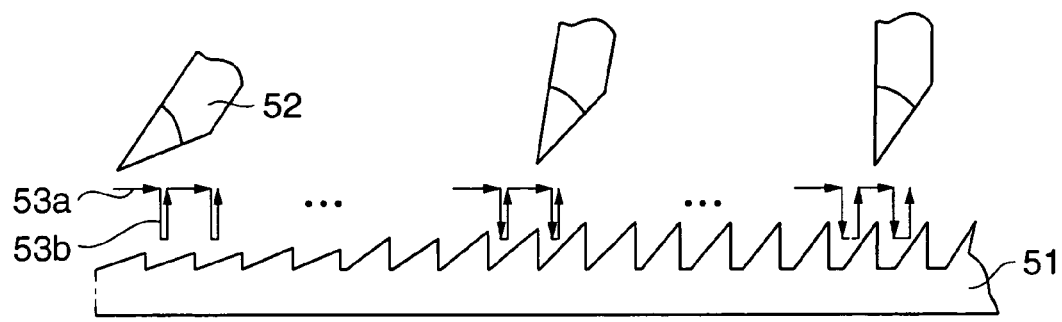
FIG. 5A is a view for explaining a first process example of the production of a mold that is used for molding a Fresnel lens sheet.
Figure 5B:
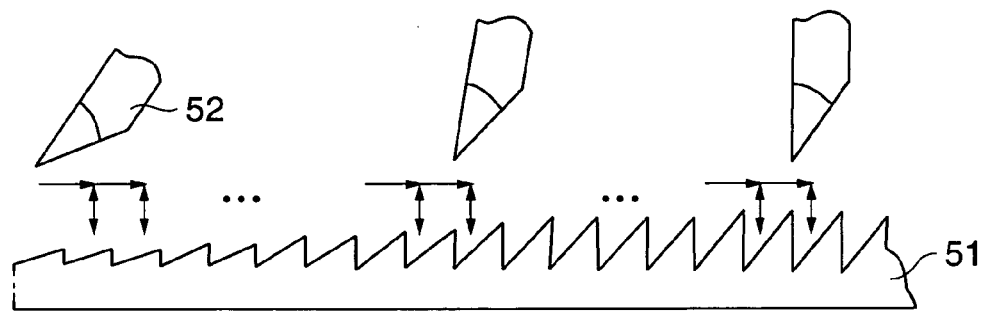
FIG. 5B is a view for explaining a conventional process of producing a mold that is used for molding a Fresnel lens sheet.
Figure 9:
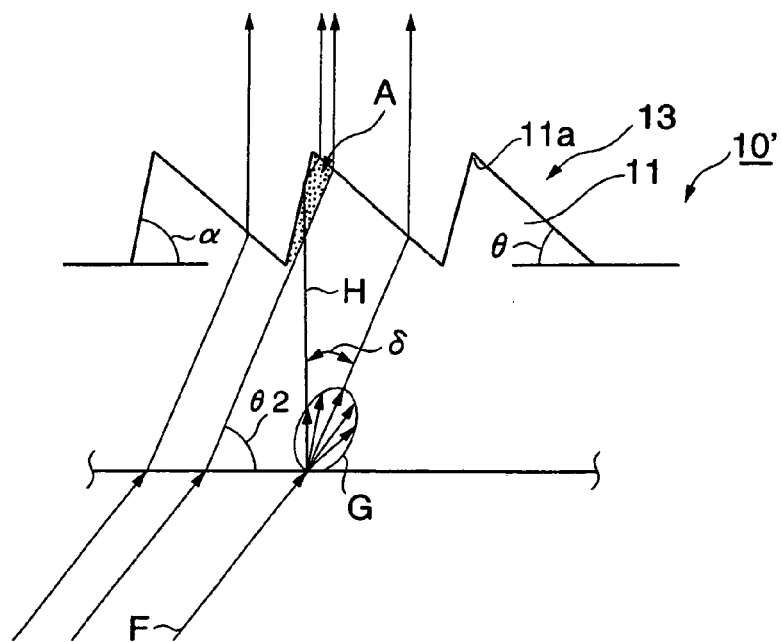
FIGS. 9 to 12 are views for explaining a conventional Fresnel lens sheet.
Figure 10:
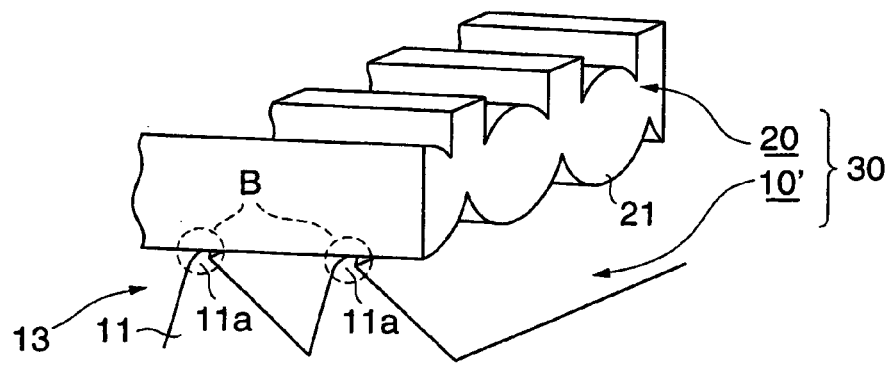
Figure 11:
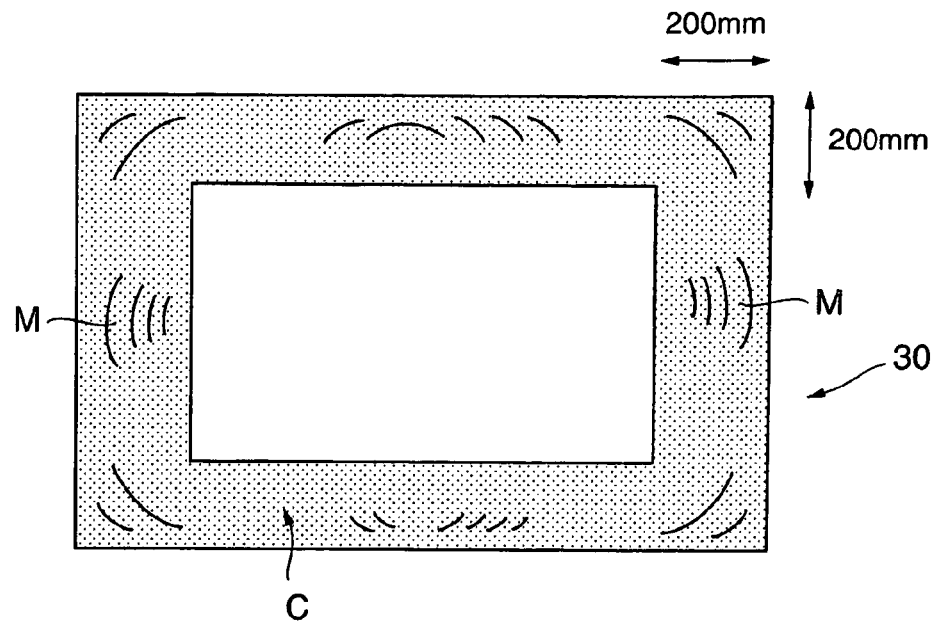
Figure 12:
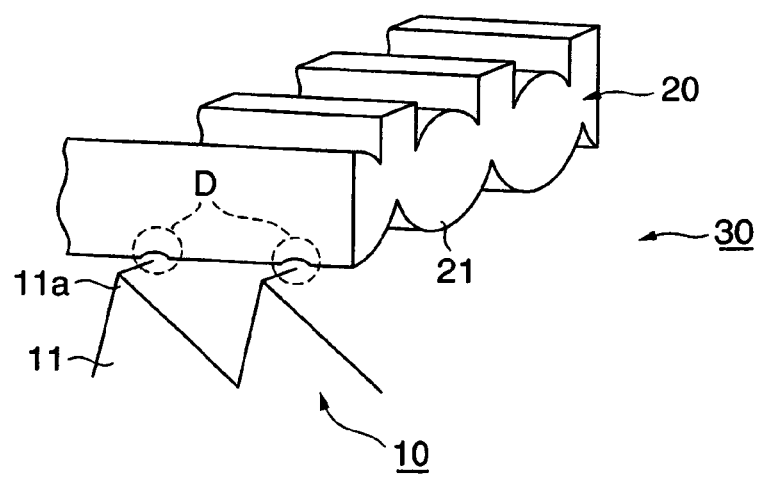

The first process is that a mold for molding the Fresnel lens sheet 10 is directly produced by means of a lathe. For example, as shown in FIG. 5, after cutting, using a tool 52 such as a cutting tool, a mold material 51 into a shape that corresponds to the lens surface of a lens on the Fresnel lens sheet 10 (see reference numeral 53*a*), the tool is moved in the direction of radius (the horizontal direction in the figure) to continue cutting to provide a shape that corresponds to the flat face of the lens (see reference numeral 53*b*), thereby obtaining the desired shape. For comparison, a process of making a mold that is used for molding such a conventional Fresnel lens sheet 10' as is shown in FIG. 9 is shown in FIG. 5B.

(Process 2)

Figure 6:
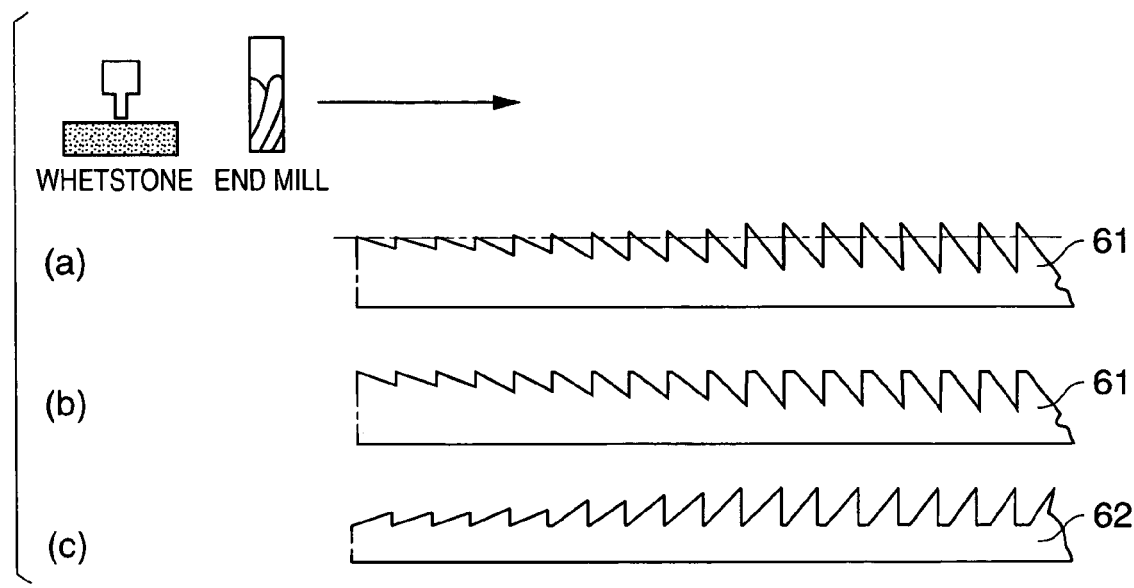
FIG. 6 is a view for explaining a second process example of the production of a mold that is used for molding a Fresnel lens sheet.

The second process is that after making, by the use of a lathe, a machined mold (master mold) for molding the Fresnel lens sheet 10, a reverse-pattern mold (mother mold) of the master mold is made by electroforming, and a reverse-pattern mold (stamping die) of the mother mold is then produced, as a mold, by electroforming or vacuum casting (see Japanese Laid-Open Patent Publication No. 166425/2002). The mother mold that is a reverse-pattern mold of the machined mold (master mold) has the same shape as that of the Fresnel lens sheet. Therefore, when the mother mold 61 is made from the master mold, if those parts of the mother mold 61 that correspond to the apexes of the lenses in the Fresnel lens part are abraded with whetstone, or cut with an end mill or the like (see FIG. 6(*a*)), it is possible to shape the mother mold 61 as desired (see FIG. 6(*b*)). Thus, it is possible to obtain the stamping die 62, a final mold, in the desired shape (see FIG. 6(*c*)).

It is also possible to use, as a master mold, the mold that is made by Process 1, in order to obtain a stamping die in the above-described manner.

Thus, according to this embodiment, the apexes 11*a* of the lenses 11 situated in the area between the center O and the outer edge P of the Fresnel lens part 13 are flattened to give flat faces 12, and the widths W of the flat faces 12 of the lenses 11 on the outer edge P side are made greater than the widths W of the flat faces 12 of the lenses 11 on the center O side. Therefore, in the area on the outer edge P side of the Fresnel lens part 13, in which the apexes 11*a* of the lenses 11 are sharper, the contact load between the Fresnel lens part 13 of the Fresnel lens sheet 10 and the lenticular lens part 21 of the lenticular lens sheet 20, that is, the pressure to be exerted on the apexes 11*a* of the lenses 11 in the Fresnel lens part 13 is effectively decreased. The previously mentioned "collapse" problem can thus be successfully avoided. In particular, if the pitch of the lenses 11 in the Fresnel lens part 13 is made very small, the contact area between the Fresnel lens part 13 and the lenticular lens part 21 increases, so that the "collapse" problem can be avoided more successfully.

Further, according to this embodiment, the apexes 11*a* of the lenses 11 situated in the area between the center O and the outer edge P of the Fresnel lens part 13 are flattened to give flat faces 12, and the widths W of the flat faces 12 of the lenses 11 on the outer edge P side are made greater than the widths W of the flat faces 12 of the lenses 11 on the center O side. Therefore, the apexes 11*a* of those lenses 11 situated in the area on the outer edge P side of the Fresnel lens part 13, in which the apexes 11*a* of the lenses 11 are sharper, become obtuse. Therefore, it becomes possible to successfully avoid the "abrasion" problem that the lenticular lens part 20 of the lenticular lens sheet 21 is abraded.

Furthermore, according to this embodiment, the apexes 11*a* of the lenses 11 situated in the area between the center O and the outer edge P of the Fresnel lens part 13 are flattened to give flat faces 12, and the widths W of the flat faces 12 of the lenses 11 on the outer edge P side are made greater than the widths W of the flat faces 12 of the lenses 11 on the center O side. Therefore, in the area on the outer edge P side of the Fresnel lens part 13, in which a moiré pattern often appears, it is possible to let diffused light H effectively emerge from the portion E through which light from a source inherently does not pass, the diffused light H being produced in the case where a diffusing agent has been incorporated in the Fresnel lens sheet 10", or where a V-type lenticular lens part has been provided on the Fresnel lens sheet 10'. Therefore, the portion E through which light from a source inherently does not pass is prevented from getting dark, and, as a result, the appearance of a moiré pattern is effectively reduced.

Namely, in the case where incident light F, light from a source, diffuses in the substrate of the Fresnel lens sheet 10 to become diffused light G, diffused light H strikes even the portion E through which the light from a source inherently does not pass, and the light eventually emerges also from the portion that is supposed to be dark. The appearance of a moiré pattern can thus be effectively prevented.

According to this embodiment, the flat faces 12 can be provided to the lenses 11 in the Fresnel lens part 13 by the use of a mold for molding the Fresnel lens part 13, processed using a conventional tool. It is, therefore, possible to simply obtain the Fresnel lens sheet 10.

Modification Embodiments

The above embodiment is described only as an example, and the present invention encompasses the following various modifications and alterations.

(1) In the above-described embodiment, the flat faces 12 of the lenses 11 in the Fresnel lens part 13 are made to linearly (continuously) increase in width W as the lens position gets away from the center O toward the outer edge P of the Fresnel lens part 13. Instead of this, the flat faces 12 of the lenses 11 may be made to increase stepwise (by stages) in width W as the lens position gets away from the center O toward the outer edge P of the Fresnel lens part 13, as shown in FIG. 7B. Further, as shown in FIG. 7C, the flat faces 12 of the lenses 11 may be made to continuously increase in width W to draw a quadratic curve as the lens position gets away from the center O toward the outer edge P of the Fresnel lens part 13. Furthermore, the flat faces 12 of the lenses 11 situated in a certain part of the area between the center O and the outer edge P of the Fresnel lens part 13 may be made to have the same width W, as shown in FIG. 7D. In this case, it is preferable that the area in which the widths W of the flat faces 12 of the lenses 11 are the same be situated on the outer edge P side of the Fresnel lens part 13.

Figure 2B:
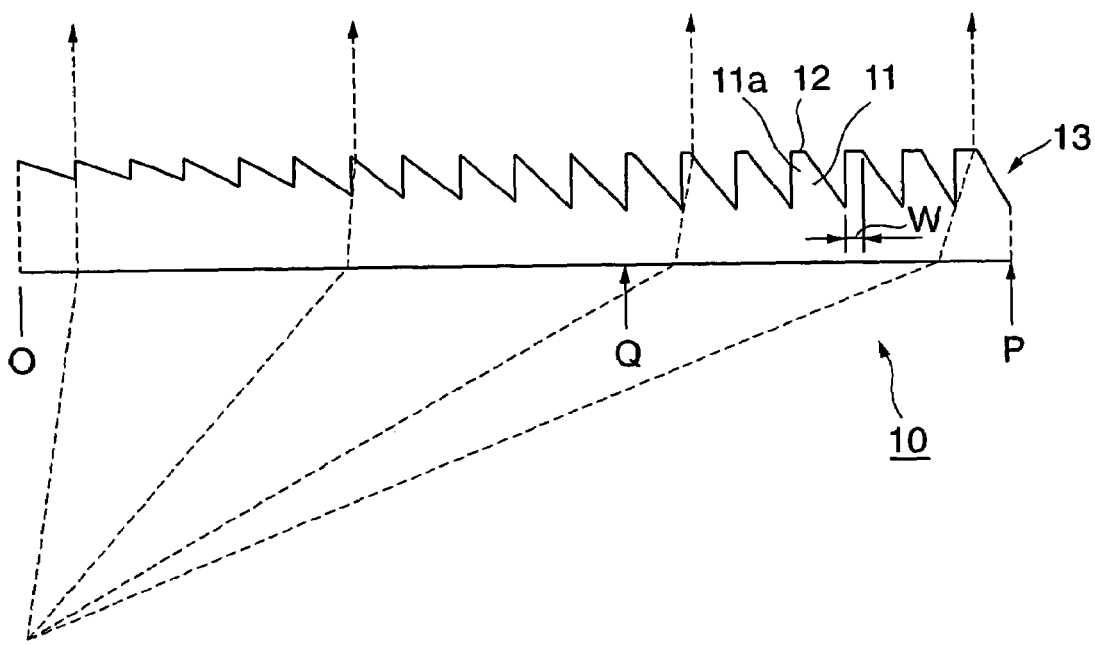
FIG. 2B is a view diagrammatically showing a Fresnel lens sheet according to another embodiment of the present invention.

(2) In the aforementioned embodiment of the invention, the apexes of the lenses 11 situated in the area between the center O and the outer edge P of the Fresnel lens part 13 are flattened to give the flat faces 12. Instead of doing so, the apexes 11*a* of only those lenses 11 situated in the area between the midpoint Q at a specified distance away from the center O of the Fresnel lens part 13 and the outer edge P of the Fresnel lens part 13 may be flattened to give flat faces 12, as shown in FIG. 2B. In this case, the area P–Q in which the flat faces 12 are formed is preferably the marginal part of the Fresnel lens sheet 10 (rear projection screen 30) along its four sides, the widths of this part being not more than 200 mm.

Figure 8A:
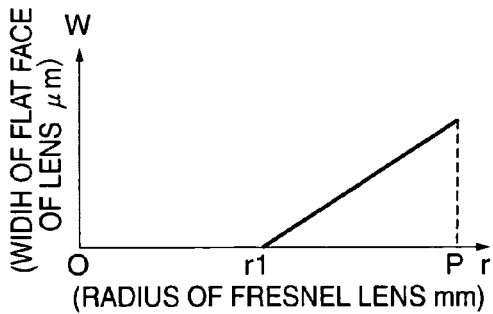
FIGS. 8A to 8H are views for showing examples of the flat faces of the lenses on the Fresnel lens sheet according to the above another embodiment of the present invention.
Figure 8E:
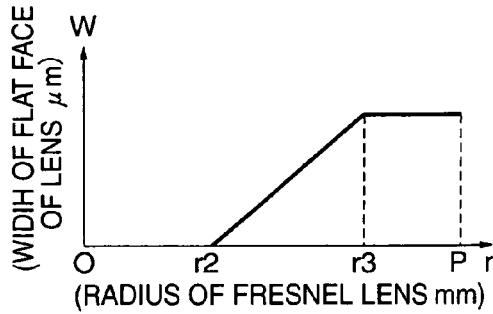
Figure 8B:
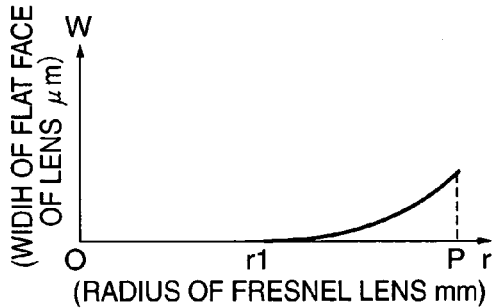
Figure 8F:
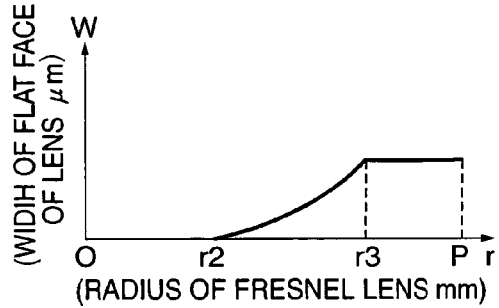
Figure 8C:
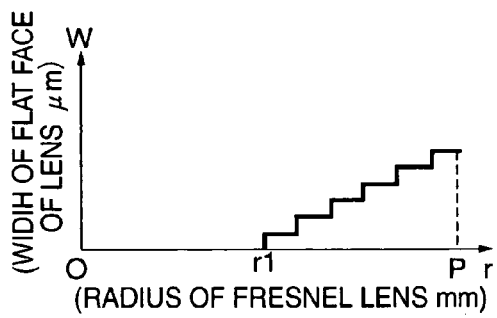
Figure 8G:
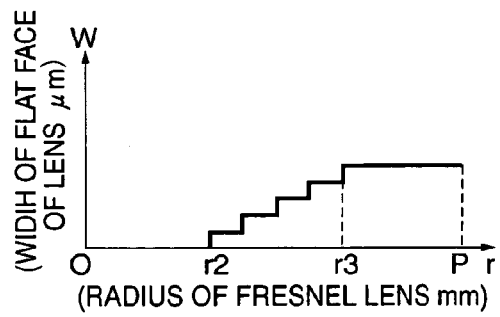

Specifically, as shown in FIG. 8A, the apexes 11a of those lenses 11 situated in the area between the midpoint r1 on the radius r (distance from the center O) of the Fresnel lens part 13 and the outer edge P of the Fresnel lens part 13 may be flattened to give flat faces 12, where the flat faces 12 of the lenses 11 are made to linearly increase in width W as the lens position gets away from the midpoint r1 toward the outer edge P. This change in width W is not limited to linear, and may also be a continuous change drawing a quadratic curve (see FIG. 8B) or a stepwise change (a change by stages) (see FIG. 8C). Further, as shown in FIGS. 8E to 8G, the flat faces 12 of the lenses 11 situated in the area between the midpoint Q and the outer edge P of the Fresnel lens part 13 may be made to have the same width W. In this case, it is preferable that the area in which the widths W of the flat faces 12 of the lenses 11 are the same be situated on the outer edge P side of the Fresnel lens part 13. Namely, as shown in FIG. 8E, the apexes 11a of those lenses 11 situated in the area between the midpoint r2 on the radius r (distance from the center O) of the Fresnel lens part 13 and the outer edge P of the Fresnel lens part 13 are flattened to give flat faces 12, where the flat faces 12 are made to linearly increase in width W between the midpoint r2 and another midpoint r3 and to have the same width W between the midpoint r3 and the outer edge P of the Fresnel lens part 13. The change in width W between the midpoint r2 and another midpoint r3 is not limited to linear, and it may also be a continuous change drawing a quadratic curve (see FIG. 8F) or a stepwise change (a change by stages) (see FIG. 8G).

Figure 8D:
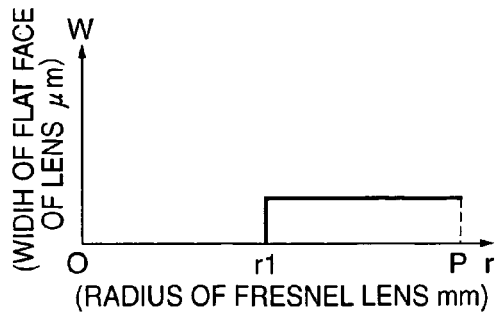

Furthermore, the flat faces 12 of those lenses 11 situated in the area between the midpoint r1 and the outer edge P of the Fresnel lens part 13 may be made to have the same width W, as shown in FIG. 8D. In this case, the flat faces 12 of the lenses 11 change in width W discontinuously at the midpoint r1 on the Fresnel lens part 13. To avoid such discontinuity, the change in width W may be made continuous in the area R-S around the midpoint r1, as shown FIG. 8H.

Figure 7A:
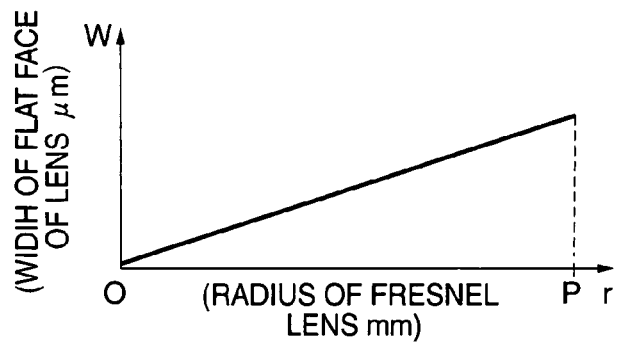
FIGS. 7A to 7D are views for showing examples of the flat faces of the lenses on the Fresnel lens sheet according to the above embodiment of the present invention.
Figure 7B:
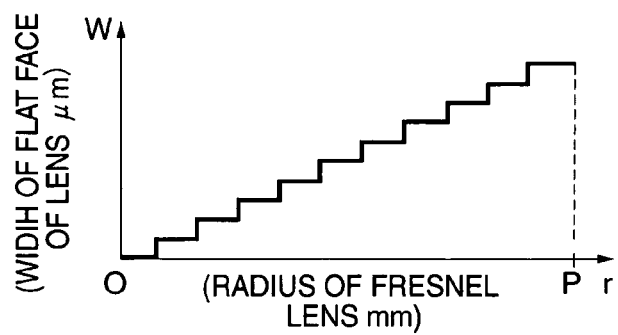
Figure 7C:
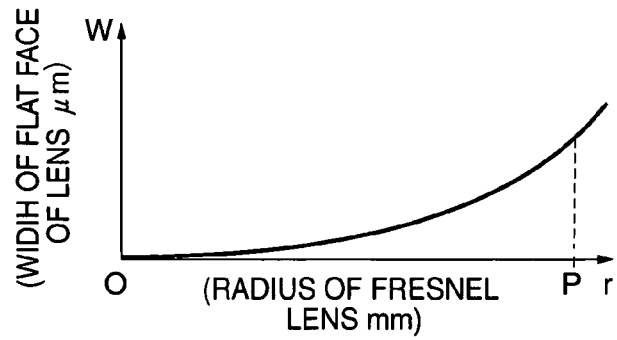
Figure 7D:
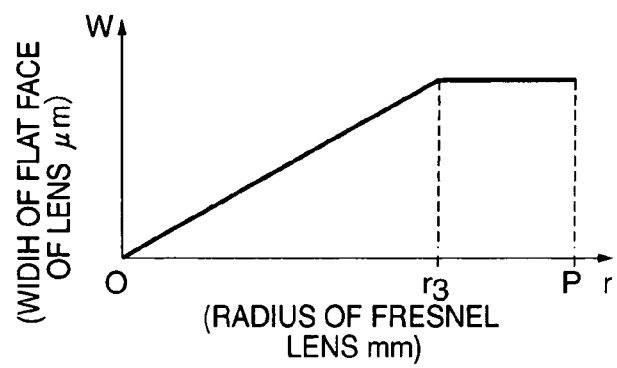

It is not necessary to change the flat faces 12 in width W in the manners as shown in FIGS. 7A to 7C or in FIGS. 8A to 8E. In consideration of those areas in which the "collapse", "abrasion" and "moiré" problems occur, the flat faces 12 may be changed in width W in any manner as long as the widths W fall in the acceptable range (within the portion E that does not affect the light path of light form a source).

(3) Further, in the aforementioned embodiment, the non-lens surface of each lens 11 in the Fresnel lens part 13 may be made to be a variety of diffusing surfaces such as a surface with stepwise roughness, having a width W in the acceptable range (within the portion E that does not affect the light path of light from a source), in order to make the Fresnel lens part 13 more easily releasable from a mold or to diffuse unnecessary light.

(4) Furthermore, the above embodiment is described by referring to the case where the Fresnel lens sheet 10 contains, in its Fresnel lens part 13, concentrically formed lenses 11 (circular Fresnel lens sheet). However, the present invention is not limited to this and is also applicable to a linear Fresnel lens sheet containing, in its Fresnel lens part, lenses that are arranged linearly.

EXAMPLES

Specific examples of the aforementioned embodiments will be given below.

Example 1

In Example 1, a Fresnel lens sheet was produced under the following design conditions, where the apexes of lenses in a Fresnel lens part were flattened to give flat faces so that each flat face was included in a portion of each lens that did not affect the light path of light from a source.

Namely, a Fresnel lens sheet was produced under the following design conditions so that the flat faces of the lenses situated in the area between the center and the outer edge of the Fresnel lens part, that is, in the area in which the radii r of the lenses were from 0 to 600 mm, had widths W linearly (continuously) increasing from 0 to 29 µm (see FIG. 7A). The radius r, the lens angle θ, the angle of refraction (90°−θ2), and the width W of the flat face were as shown in Table 1.

TABLE 1

| | Radius r (mm) | | | | | | |
|---|---|---|---|---|---|---|---|
| | 0 | 100 | 200 | 300 | 400 | 500 | 600 |
| θ (°) | 0 | 10.42 | 20.24 | 29.04 | 36.64 | 43.06 | 48.41 |
| 90 − θ2 (°) | 0 | 3.68 | 7.27 | 10.68 | 13.86 | 16.77 | 19.39 |
| W (µm) | 0 | 1.3 | 4.7 | 10.0 | 15.5 | 22.5 | 29.0 |

The other basic design conditions were as follows:
Focal length f1 on the plane of incidence=1000 mm
Focal length f2 on the plane of emergence=98000 mm
Lens pitch=0.1 mm
Angle of tool tip=45°

Example 2

In Example 2, a Fresnel lens sheet was produced under the same design conditions as in Example 1, where the widths W of the flat faces of the lenses situated in the area between the center and the outer edge of the Fresnel lens part, that is, in the area in which the radii r of the lenses were from 0 to 600 mm, were controlled not to exceed the values shown in Table 1 and were changed from 0 to 20 µm stepwise (by stages) at every 2 µm (at every 50 mm in the direction of radius) (see FIG. 7B).

Example 3

Figure 8H:
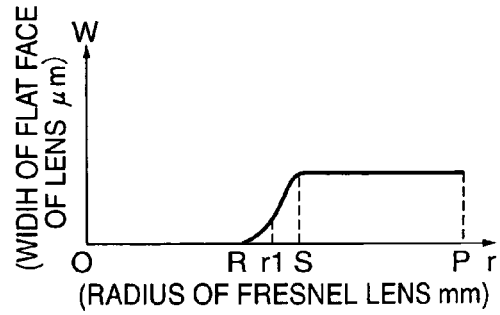

In Example 3, a Fresnel lens sheet was produced under the same design conditions as in Example 1, where the widths W of the flat faces of the lenses situated in the area in which the radii r of the lenses were from 0 to 200 mm were made 0 µm, the widths W of the flat faces of the lenses situated in the area in which the radii r of the lenses were from 200 to 250 mm were smoothly varied from 0 to 3 µm, and the widths W of the flat faces of the lenses situated in the area in which the radii r of the lenses were from 250 to 600 mm were made the same (3 µm) (see FIG. 8H).

Comparative Example

A comparative Fresnel lens sheet comprising a Fresnel lens part containing lenses having no flat faces was produced.

(Results of Evaluation)

Each one of the Fresnel lens sheets of Examples 1 to 3 and Comparative Example was combined with a lenticular lens sheet in the same size as that of the Fresnel lens sheet. This combination was mounted in the frame of a rear projection type display, and the collapse test and the vibration test were conducted to evaluate the Fresnel lens sheets in terms of the "collapse", "abrasion" and "moiré" problems. The results were as shown in Table 2. These results clearly demonstrate that the Fresnel lens sheets of Examples 1 to 3 successfully avoided the "collapse", "abrasion" and "moiré" problems.

The "collapse test" herein conducted is as follows: the Fresnel lens sheet and the lenticular lens sheet are affixed to each other at their four sides with an adhesive tape and are mounted in the frame of a rear projection type display; a white solid image is then projected on the entire surface of this display to confirm whether the lenses on the Fresnel lens sheet are collapsed or not. In this test, dark-and-bright patterns appear in the area in which the lenses are collapsed.

The "vibration test" herein conducted is as follows: the Fresnel lens sheet and the lenticular lens sheet are affixed to each other at their four sides with an adhesive tape and are mounted in the frame of a rear projection type display; the display with the frame is placed on a variation tester and is vibrated in a low-temperature environment (−20° C.) for 1 hour; a white solid image is then projected on the entire surface of this display to confirm whether the lenticular lens part is abraded or not. In this test, dark-and-bright patterns appear in the area in which "abrasion" has occurred (in the area in which the lenticular lens is abraded), and this area looks darkish.

TABLE 2

|  | Collapse | Abrasion | Moiré |
| --- | --- | --- | --- |
| Example 1 | ○ | ○ | ○ |
| Example 2 | ○ | ○ | ○ |
| Example 3 | ○ | ○ | ○ |
| Comp. Ex. | X | X | X |

The invention claimed is:

1. A Fresnel lens sheet for use in a rear projection screen, comprising:
a Fresnel lens part containing a plurality of lenses formed on one plane,
wherein, among the lenses of the Fresnel lens part, apexes of those lenses situated in at least a part of an area between a center and an outer edge of the Fresnel lens part are flattened to give flat faces, and
widths of the flat faces of the lenses on a side of the outer edge are made greater than widths of the flat faces of the lenses on a side of the centers,
wherein the widths of the flat faces of the lenses are from 0 to 30 μm.

2. The Fresnel lens sheet according to claim 1, wherein the flat faces of the lenses continuously increase in width as a lens position gets away from the center toward the outer edge of the Fresnel lens part.

3. The Fresnel lens sheet according to claim 1, wherein the flat faces of the lenses increase stepwise in width as a lens position gets away from the center toward the outer edge of the Fresnel lens part.

4. The Fresnel lens sheet according to claim 1, wherein the flat faces of the lenses that are situated in a certain area of the Fresnel lens part have a same width.

5. The Fresnel lens sheet according to claim 4, wherein the area in which the widths of the flat faces of the lenses are the same is situated on the side of the outer edge of the Fresnel lens part.

6. The Fresnel lens sheet according to claim 1, wherein an apex of each of the lenses is flattened to give a flat face within a portion of the lens that does not affect a light path of light from a source.

7. The Fresnel lens sheet according to claim 1, wherein the apexes of only those lenses situated in an area between a midpoint at a specified distance away from the center of the Fresnel lens part and the outer edge of the Fresnel lens part are flattened to give flat faces.

8. The Fresnel lens sheet according to claim 1, wherein the lenses are formed concentrically.

* * * * *